ary method, the time required for
UNITED STATES PATENT OFFICE.

MASAHIDE HANABUSA, OF TOKYO, JAPAN.

PROCESS OF MANUFACTURING LIGHT FIRE-BRICK.

1,074,618.  Specification of Letters Patent.  Patented Oct. 7, 1913.

No Drawing.  Application filed February 14, 1912. Serial No. 677,511.

*To all whom it may concern:*

Be it known that I, MASAHIDE HANABUSA, a subject of the Emperor of Japan, residing at No. 7 Shin-monzen-Cho, Shiba, Azabuku, city of Tokyo, Empire of Japan, have invented a new and useful Improvement in the Process for Manufacturing Light Fire-Brick, of which the following is a specification.

This invention relates to improvements in the process of manufacturing fire-bricks, and has for its object to produce such a very light fire brick as might be satisfactorily used for marine boilers, furnaces or the like.

Further object is to shorten, as compared with ordinary method, the time required for burning or baking the same in kiln so as to insure not only the economy of fuel but to advance the rate of output as well as to prolong the life of manufactured articles.

My invention consists first by mixing two particular kinds of clay, that is, the one which has a great plasticity shall be mixed with the other of very highly refractory character. To the mixture will be then added a little quantity of sulfur together with certain friable substances, such as powdered coal, powdered coke, or saw dust, etc., before they are burned in kiln.

The sulfur, powdered coal, powdered coke, etc., mixed with the brick materials when burned away will render the resulting brick so porous as to reduce its weight greatly.

The use of sulfur is an important and essential part of my improved process, as without it the thorough burning of the combustible materials will not be accomplished in such a short interval of time.

To insure the durability of the product, I have found that the slight addition of graphite to the mixture will admirably answer the purpose.

In practice, I mix approximately same quantities of two different clays known as Mitsuishi-fire-clay and Gifu-Gairume-clay respectively. The former has an extremely refractory character and are abundantly found in Okayama district, while the latter which possess a great plasticity found mostly in Gifu-district. To the clays thus mixed will be then added certain friable substances, such as powdered coal, powdered coke, saw dust, etc., associated by further addition of little sulfur to work and burn just in same manner as customary with any other fire brick making, except using some graphite in the mixture for strengthening purpose.

I claim:—

1. Process for producing light-fire bricks which consists in mixing clay of great plasticity with clay of a highly refractory character, adding sulfur mixed with a powdered friable material to the mixture, and finally subjected the mass to heat.

2. Process for producing light fire bricks which consists in mixing clay of great plasticity with clay of a highly refractory character, adding sulfur mixed with a finely divided combustible material to the mixture, and finally subjecting the mass to heat.

3. Process for producing light fire bricks which consists in mixing clay of great plasticity with clay of a highly refractory character, adding sulfur mixed with powdered coal to the mixture, and finally subjecting the mass to heat.

In testimony whereof I affix my signature in presence of two witnesses.

MASAHIDE HANABUSA.

Witnesses:
HARUTADA YASUMERA,
GEUJI KUSIBARA.